United States Patent [19]

McAdams, Sr.

[11] 4,093,256
[45] June 6, 1978

[54] LOCKING MECHANISM FOR AUTOMOBILE FENDER SKIRT

[76] Inventor: Luther J. McAdams, Sr., 1626 E. 91st Pl., Chicago, Ill. 60617

[21] Appl. No.: 795,727

[22] Filed: May 11, 1977

[51] Int. Cl.² .............................................. B60J 9/00
[52] U.S. Cl. .................................. 280/153 R; 70/259; 292/DIG. 1
[58] Field of Search .............. 280/153 R; 292/DIG. 1, 292/89, 31, 80, 202; 70/259, 258, 166, DIG. 1

[56] References Cited
U.S. PATENT DOCUMENTS

| Re. 20,857 | 9/1938 | Haltenberger | 280/153 R |
|---|---|---|---|
| 1,942,176 | 1/1934 | Lowe | 70/259 |
| 1,954,919 | 4/1934 | Carey | 280/153 R |
| 2,122,564 | 7/1938 | Fergueson | 280/153 R |
| 2,181,367 | 11/1939 | Fergueson | 280/153 R |
| 2,222,610 | 11/1940 | Fergueson | 280/153 R |
| 2,460,349 | 2/1949 | Hessler | 280/153 R |
| 2,616,721 | 11/1952 | Schatzman | 280/153 R |
| 2,866,652 | 12/1958 | Schatzman | 280/153 R |
| 3,170,733 | 2/1965 | Lamme | 70/259 |

*Primary Examiner*—Robert R. Song
*Attorney, Agent, or Firm*—Kinzer, Plyer, Dorn & McEachran

[57] ABSTRACT

A locking device for an automobile fender skirt of the type which is pivotally supported on an automobile fender by hooks located at the lower edges of the front and rear portions of the fender skirt. The fender skirt has a pivotally mounted latch at the top thereof which extends behind the fender to prevent removal of the fender skirt. The latch is pivoted by operation of an arm which is integrally formed with the latch. A locking device is provided which includes an angle and a threaded rod which engages a threaded opening in one leg of the angle. This locking device encloses the latch arm between the threaded rod and the legs of the angle when the latch extends behind the fender. A key operated disc tumbler cylinder lock plug is connected to one end of the threaded rod. The lock plug has radially extending discs projecting from the plug along the length thereof. A key is insertable in the cylinder lock plug to retract the discs. A cylinder lock housing is attached to and extends through the fender skirt. The lock housing has a passage therethrough with the passage including a cylindrical portion adapted to receive the cylinder lock plug and spaced longitudinally extending stops adapted to engage the radially extending discs to prevent rotation of the cylinder lock in the passage.

3 Claims, 4 Drawing Figures

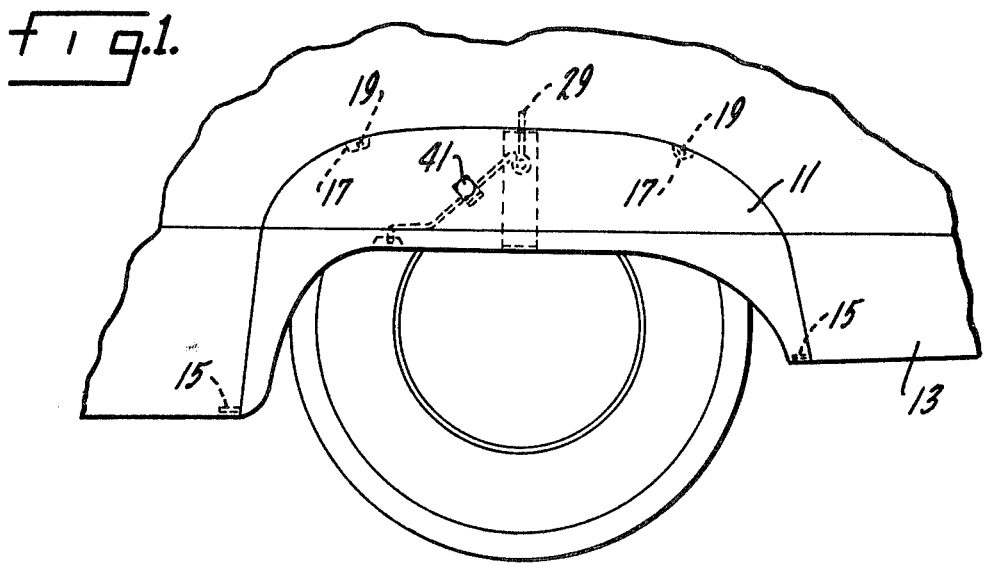
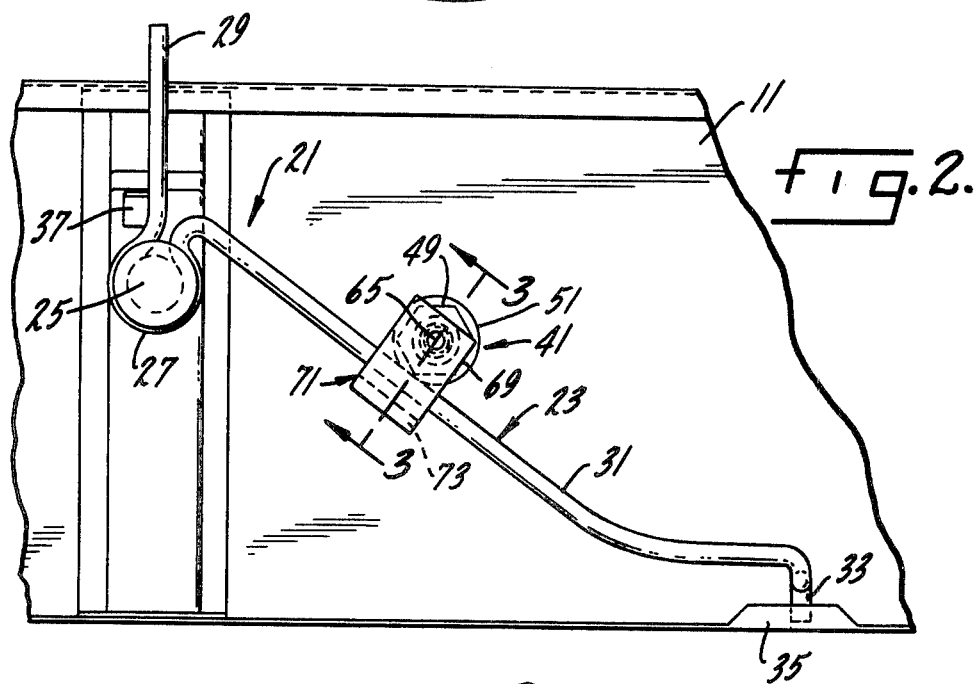
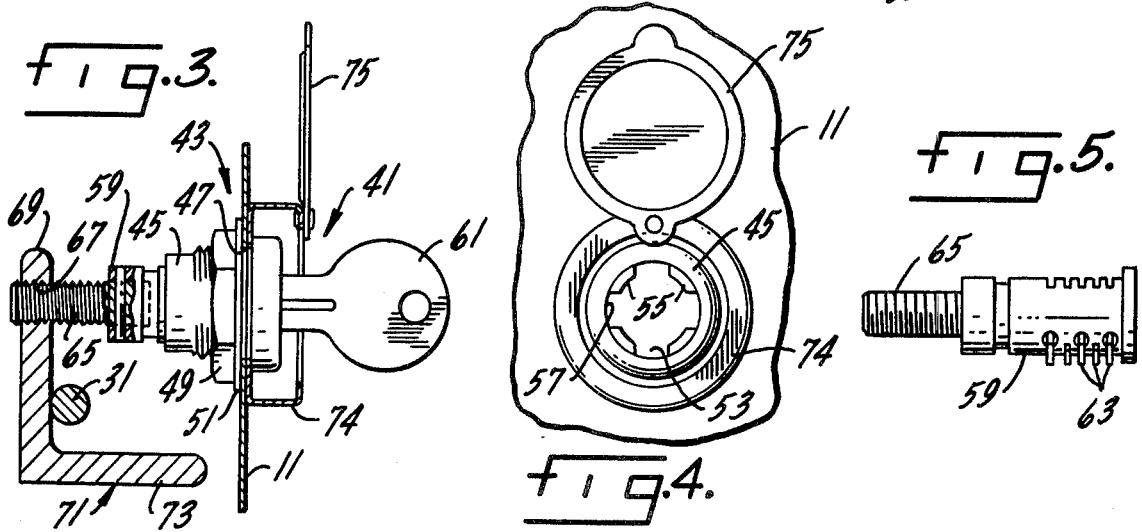

LOCKING MECHANISM FOR AUTOMOBILE FENDER SKIRT

BACKGROUND AND SUMMARY OF THE INVENTION

Locking devices are a necessity for fender skirts on modern automobiles because of the high cost of fender skirts. Locking devices are especially needed in urban areas which have high crime rates. In such areas, protected parking facilities are not available and automobile owners must park their automobiles on public streets and in unguarded parking lots. Fender skirts are highly vulnerable to theft under such circumstances, especially by gangs of youths who can remove the fender skirts from an automobile in a matter of seconds.

Both locking and fastening devices for automobile fender skirts have been known or suggested over the years but none have gained wide spread public acceptance. The applicant is aware of various devices which are shown in the following listed patents which were found in a search in the U.S. Patent and Trademark Office. However, applicant has no personal knowledge that any of the devices shown in these patents have ever been used on automobiles.

U.S. Pat. No. 1,954,919 issued to Carey shows a combination U-shaped hook and bolt 25 which is used to attach an advertising sign to an automobile fender. The hook end 27 of the device attaches to the automobile fender. A washer 30 and a nut 31 fit over the threaded bolt portion of the device.

U.S. Pat. Nos. 2,122,564 and 2,181,367 to Fergueson show a cylinder locking device 30 having an eccentric end plate 33 which extends behind a fender bead 37 of an automobile to lock the fender skirt to the automobile fender.

U.S. Pat. No. Re. 20,857 to Haltenberger shows a fender skirt having a key operated locking device 80 located above a spring lever 22, 23. The locking device 80 has a bolt which in the locked position passes through aligned holes in the fender bead and the channel bottom to hold the fender skirt to the automobile fender.

Fergueson U.S. Pat. No. 2,222,610 shows a key operated tumbler lock 38 mounted on the fender skirt of an automobile and having radially extending fingers 48 which engage the rear end of the sleeve 43 mounted on the fender 10.

U.S. Pat. No. 2,460,349 to Hessler shows a fender skirt which is locked in place by a latch plate 34 that is actuated by a lock 36. A pair of links or bars 38 pivotally mounted on the latch plate 34 extend through guide brackets 40 fastened to the fender skirt. The links 38 fit behind the fender when fully extended to prevent removal of the fender skirt from the automobile.

Schatzman U.S. Pat. No. 2,616,721 shows a fender skirt having a pivotally mounted latch 71 and an operating arm 48. Schatzman U.S. Pat. No. 2,866,652 shows a fender skirt latching mechanism having a latching arm 34 operated by a pivotally mounted operating arm 33.

None of the foregoing patents shows a locking device that can readily be adapted to the latching mechanism on the fender skirt of a modern automobile. Such a latching mechanism consists of a pivotally mounted latch having an integral arm which is released by lifting the arm a short distance to clear a tab, moving the arm laterally a short distance and then allowing the arm to drop to swing the latch clear of locking engagement behind the automobile fender.

Therefore, an object of this invention is a key operated locking mechanism which can be adapted to the latching mechanism of a fender skirt on a modern automobile.

Another object of this invention is a locking device for an automobile fender skirt which completely encloses the operating arm for the fender skirt latch.

Another object of this invention is a locking mechanism having a threaded rod which engages an angle to form a locking enclosure.

Another object of this invention is a locking mechanism which can be readily adjusted for different types of fender skirt latching mechanisms.

Other objects may be found in the following specification, claims and drawings.

BRIEF DESCRIPTION OF THE DRAWINGS

The invention is illustrated more or less diagrammatically in the following drawings wherein:

FIG. 1 is a partial side elevational view of a locking mechanism for a fender skirt of a modern automobile with parts being shown in phantom;

FIG. 2 is an enlarged partial side elevational view of the fender skirt of FIG. 1 viewed from the opposite direction;

FIG. 3 is an enlarged view taken along line 3—3 of FIG. 2;

FIG. 4 is a front elevational view of the lock housing of FIG. 3 with the lock plug removed for clarity of illustration; and FIG. 5 is a side elevational view of the lock plug of FIG. 3 removed from the lock housing.

DESCRIPTION OF THE PREFERRED EMBODIMENT

FIG. 1 of the drawings shows a portion of an automobile including a fender skirt 11 mounted on an automobile fender 13. As is conventional, the fender skirt is provided with hooks 15 located at the lower edges thereof which engage the automobile fender and support the fender skirt. The fender skirt is also provided with a pair of sockets 17 located at the upper edge thereof and which fit over projecting pins 19 on the automobile fender to support the fender skirt.

A latch assembly 21 is mounted on the inside of the fender skirt. The latch assembly includes an elongated rod 23 bent in an irregular shape. It is pivotally mounted on a headed post 25 by means of a loop 27 formed in the rod. A short latch 29 is located on one side of the loop and an elongated latch arm 31 extends from the opposite side of the loop. The latch arm terminates in a finger 33 which fits behind and engages an upstanding tab 35 formed on the fender skirt. A stop 37 formed as part of the fender skirt engages one side of the latch 29 to limit its movement in one direction past a vertical position. All of the foregoing items are part of a conventional automobile fender skirt and latching mechanism.

The invention herein resides in the lockng mechanism 41 which prevents unauthorized movement of the latch rod 23 from its fender skirt locking position. The locking mechanism 41 of this invention includes a key operated lock 43, shown in detail in FIGS. 3, 4 and 5. The key operated lock includes a tubular body 45 which extends through an opening 47 in the fender skirt 11 and is held to the fender skirt by a nut 49 which engages a washer 51. As is conventional, the nut and washer are located on the inside surface of the fender skirt. The tubular lock body 45 includes a cylindrical passage 53 extending therethrough. Circumferentially spaced longitudinally extending stops 55 are formed around the wall of the cylindrical passage. Longitudinally extending grooves 57 are defined by the stops 55.

A key operated disc type tumbler cylindrical lock plug 59 operated by a key 61 fits into the cylindrical passage 53 of the lock body 45. The lock plug has radially extending discs 63 which project from the plug and are spaced along the length thereof. The discs are dimensioned so that they fit in the longitudinal grooves 57 located between the longitudinally extending stops 55 to thereby prevent rotation of the plug when the discs are extended. A threaded rod 65 extends from the inner end of the lock plug. The rod threadedly engages a threaded hole 67 formed in one leg 69 of an angle 71. The other leg 73 of the angle extends parallel to the rod 65 and toward the fender skirt 11. When installed on the fender skirt, the tubular lock body 45, the threaded rod 63, and the angle 71 engulf the latch operating arm 31 of the latch rod 23 to prevent movement of the latch and release of the fender skirt.

To complete the locking mechanism assembly, a cylindical housing 74 and a pivotally mounted cover 75 are installed over the key operated locking mechanism 41 to protect the lock plug against dirt, rain, etc.

To remove the fender skirt, the key 61 is inserted into the lock plug 59. The insertion of the key retracts the discs 63 into the lock plug. The key can then be turned in a clockwise direction to unthread the rod 65 from the threaded hole 67 in the angle 71. This permits the angle 71 to drop off freeing the latch assembly 21 to be unlatched.

I claim:

1. A locking device for an automobile fender skirt of the type which is pivotally supported on an automobile fender by hooks located at the lower edges of the front and rear portions of the fender skirt and has a pivotally mounted latch at the top of the fender skirt which latch extends behind the fender to prevent removal of the fender skirt from the fender, said latch being pivoted by operation of an arm integrally formed therewith, said locking device including:

an angle, a threaded rod engaging a threaded opening in one leg of the angle to thereby enclosed said latch arm between the threaded rod and the legs of the angle when the latch extends behind the fender, a key operated disc tumbler cylinder lock plug connected to one end of said threaded rod and having radially extending discs projecting from the plug along the length thereof, said key being insertable in the cylinder lock plug to retract said discs, a cylinder lock housing fastened to and extending through said fender skirt, said cylinder lock housing having a passage extending therethrough with said passage including a cylindrical portion adapted to receive said disc tumbler cylinder lock plug and spaced longitudinally extending stops adapted to engage said radially extending discs to prevent rotation of said key operated cylinder lock plug in said passage.

2. The locking device of claim 1 in which said threaded rod is located above said latch arm and a leg of said angle is located below said latch arm when said latch extends behind the fender.

3. The locking device of claim 1 in which said threaded rod and said angle form a U-shaped bail for said latch handle with the open end of said U-shaped bail facing said fender skirt.

* * * * *